United States Patent
Xu et al.

(10) Patent No.: US 10,488,581 B2
(45) Date of Patent: Nov. 26, 2019

(54) FRAME, OPTICAL FILM, BACKLIGHT AND DISPLAY DEVICE

(71) Applicant: BOE TECHNOLOGY GROUP CO., LTD., Beijing (CN)

(72) Inventors: Jian Xu, Beijing (CN); Jianbo Xian, Beijing (CN); Xinyin Wu, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/918,345

(22) Filed: Mar. 12, 2018

(65) Prior Publication Data
US 2019/0064427 A1 Feb. 28, 2019

(30) Foreign Application Priority Data
Aug. 30, 2017 (CN) .......................... 2017 1 0765492

(51) Int. Cl.
*G02F 1/1333* (2006.01)
*F21V 8/00* (2006.01)
(52) U.S. Cl.
CPC ..... *G02B 6/0086* (2013.01); *G02F 1/133308* (2013.01); *G02F 2201/46* (2013.01)
(58) Field of Classification Search
CPC ............... G02B 6/0086; G02F 2201/46; G02F 2001/133317; G02F 1/133308
See application file for complete search history.

(56) References Cited

U.S. PATENT DOCUMENTS

| 2006/0290836 | A1* | 12/2006 | Chang | G02B 6/0088 349/58 |
| 2008/0143918 | A1* | 6/2008 | Kim | G02F 1/133608 349/58 |
| 2009/0009942 | A1* | 1/2009 | Hsu | B29C 45/14811 361/679.09 |
| 2016/0363723 | A1* | 12/2016 | Choi | G02B 6/0091 |

(Continued)

FOREIGN PATENT DOCUMENTS

| CN | 1584696 A | 2/2005 |
| CN | 1885132 A | 12/2006 |

(Continued)

OTHER PUBLICATIONS

First Office Action for CN Appl. No. 201710765492.7, dated Aug. 20, 2019.

*Primary Examiner* — Steven T Sawyer
*Assistant Examiner* — Sagar Shrestha
(74) *Attorney, Agent, or Firm* — Foley & Lardner LLP; James F. Ewing; Paul M. H. Pua

(57) ABSTRACT

The present disclosure relates to the technical field of display technology, and discloses a frame, an optical film, a backlight and a display device. A frame for a display device, comprising a frame body made of a flexible material, wherein the frame body comprises corner frame portions corresponding to corners of the display device, each of the corner frame portions includes a base plate, the base plate has a carrying surface for carrying a display panel; and a hook assembly provided on a side of the base plate opposite to the carrying surface, wherein the hook assembly is configured to coordinate with a back plate in the display device to fix the frame body to the back plate.

14 Claims, 5 Drawing Sheets

(56) References Cited

U.S. PATENT DOCUMENTS

2016/0363805 A1* 12/2016 Lee .................. G02F 1/133308
2018/0356671 A1* 12/2018 Ma ................... G02F 1/133308

FOREIGN PATENT DOCUMENTS

| CN | 101201510 A | 6/2008 |
| CN | 201166780 Y | 12/2008 |
| CN | 101737735 A | 6/2010 |
| CN | 102629006 A | 8/2012 |
| CN | 203147502 U | 8/2013 |
| CN | 103759227 A | 4/2014 |
| CN | 105204211 A | 12/2015 |
| CN | 205229625 U | 5/2016 |
| CN | 106249474 A | 12/2016 |

* cited by examiner

FRAME, OPTICAL FILM, BACKLIGHT AND DISPLAY DEVICE

CROSS REFERENCE TO RELATED APPLICATIONS

This application claims priority to Chinese Patent Application No. 201710765492.7, filed on Aug. 30, 2017, which is hereby incorporated by reference in its entirety.

TECHNICAL FIELD

The present disclosure relates to a technical field of display, in particular to a frame, an optical film, a backlight and a display device.

BACKGROUND

In display devices such as liquid crystal display (LCD), etc, a frame is usually adopted to fix components of a backlight.

SUMMARY

According to a first aspect of the present disclosure, a frame for a display device is provided, which comprises a frame body made of a flexible material, wherein the frame body comprises corner frame portions corresponding to corners of the display device, each of the corner frame portions includes a base plate, the base plate has a carrying surface for carrying a display panel; and a hook assembly provided on a side of the base plate opposite to the carrying surface, wherein the hook assembly is configured to coordinate with a back plate in the display device to fix the frame body to the back plate.

According to a second aspect of the present disclosure, an optical film for a display device is provided, which comprises an optical film body provided with holes corresponding to the hooks in the hook assembly of the frame according to the first aspect of the present disclosure.

According to a third aspect of the present disclosure, a backlight for a display device is provided, which comprises: a back plate; an optical film according to the second aspect of the present disclosure, which is disposed on a side of the back plate opposite to a light source, and a frame according to the first aspect of the present disclosure, which is disposed on a side of the optical film opposite to the back plate, wherein the back plate has holes corresponding to the hooks in the hook assembly of the frame body, and the back plate is engaged with the frame body by the hooks.

According to a fourth aspect of the present disclosure, a display device is provided, which comprises a display panel and a back light according to the third aspect of the present disclosure, wherein the display panel is provided on a side of the frame body opposite to the optical film.

DETAILED DESCRIPTIONS

The technical solutions in the embodiments of the present disclosure will be clearly and completely described below with reference to the accompanying drawings of the embodiments of the present disclosure. Apparently, the described embodiments are merely some but not all of the embodiments of the present disclosure. All other embodiments obtained by a person skilled in the art based on the embodiments of the present disclosure without paying creative effort shall belong to the scope of protection of the present disclosure.

Figure 1:
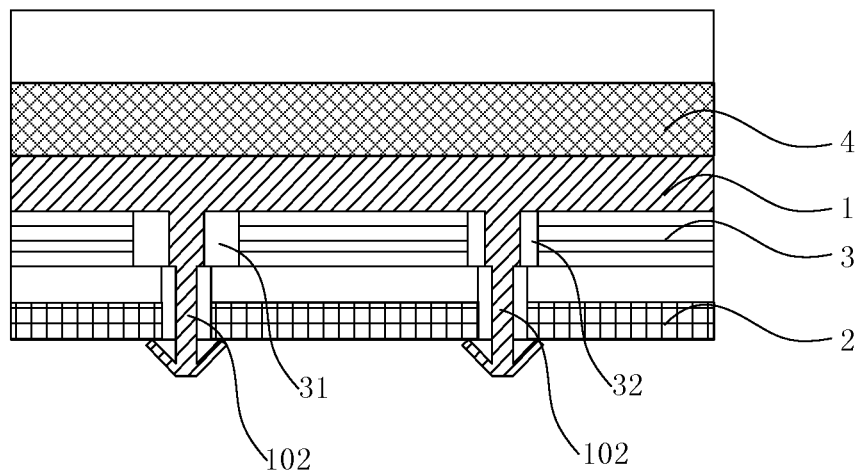
FIG. 1 is a schematic structural diagram of a display device after a frame is installed according to an embodiment of the present disclosure.
Figure 2:
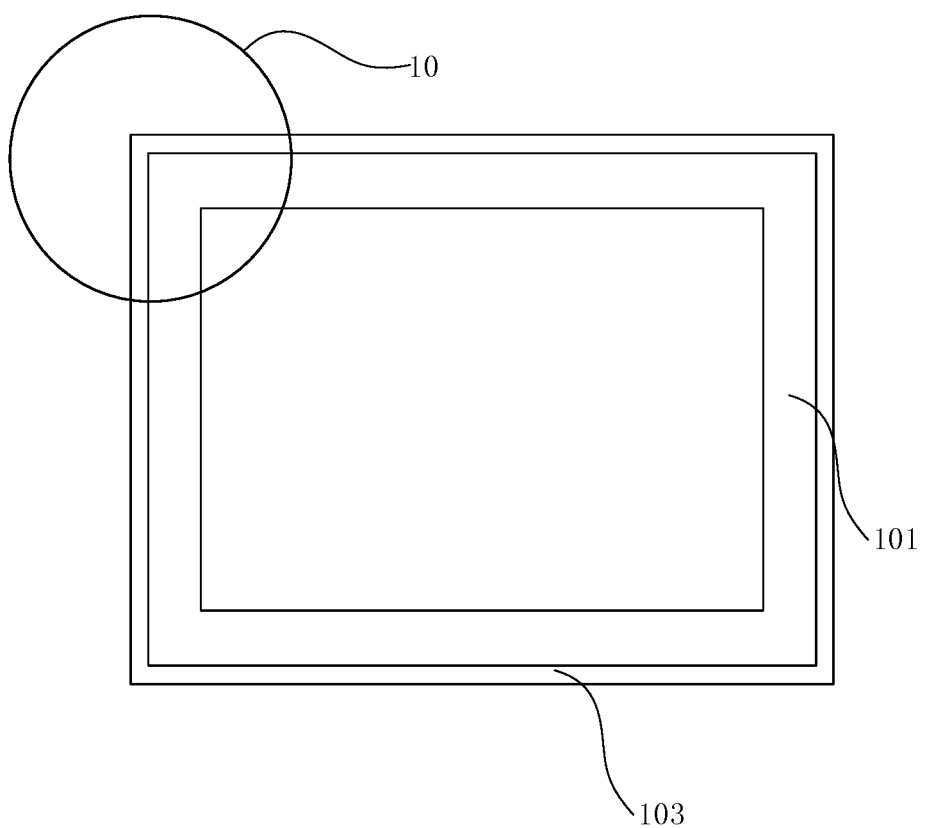
FIG. 2 is a schematic structural diagram of a frame body according to an embodiment of the present disclosure.

With reference to FIGS. 1 and 2, the present disclosure provides a frame for a display device, comprising a frame body 1 made of a flexible material. The frame body 1 includes corner frame portions 10 in one-to-one correspondence with sides and/or corners of the display device, wherein each of the corner frame portions 10 includes a base plate 101. The base plate 101 has a carrying surface for carrying a display panel 4 of the display device. A hook assembly 102 is provided on a side of the base plate 101 opposite to the carrying surface. The hook assembly 102 is configured to coordinate with a back plate 2 in the display device to fix the frame body 1 to the back plate 2. Moreover, the outer edge of the base plate 101 forms side flanges 103. Side flanges 103 of the four corner frame portions 10 coordinate with the carrying surface to form an accommodation space for accommodating the display panel 4 in the display device.

The frame comprises a frame body 1 made of a flexible material. The frame body 1 comprises corner frame portions 10 in one-to-one correspondence with sides and/or corners of the display device. Each corner frame portion 10 comprises a base plate 101 and a side flange 103. And the base plate 101 has a carrying surface for carrying a display panel 4 in the display device. The corner frame portions 10 coordinate with the back plate 2 in the display device by means of the hook assembly 102, which is provided on a side of the base plate 101 opposite to the carrying surface, so as to be fixed to the back plate 2. This structure enhances the stability of the relative position between the frame as provided by the present disclosure and the optical film 3 as well as the back plate 2. Moreover, since the frame body 1 is made of a flexible material, the display panel 4 can be placed in the accommodation space enclosed by the side flanges 103 formed on the outer edge of the base plate 101 even if the size difference between the frame body 1 and the display panel 4 is relatively large. In addition, since the frame body 1 made of a flexible material is in soft contact with the display panel 4, no corner breaks when the display panel 4 is shaken relative to the frame body 1, so as to ensure integrity of the display panel 4.

The aforementioned frame not only achieves an effect of fixing, but also avoids bumping of the display panel 4 against the frame body 1, so as to ensure the integrity of the display panel 4, thereby enhancing the display quality. In addition, the above frame allows the range of the difference between the frame body 1 and the display panel 4 to be larger than the difference in the prior art, which reduces the difficulty of the assembling process, speeds up manufacture and increases productivity, thereby saving manufacturing cost.

Therefore, the frame adopts the frame body 1 made of the flexible material to provide protection for the display panel 4. This is helpful for improving display quality.

It should be noted that the display device includes four sides and/or corners. That is, the display device has four angles.

On the basis of the above technical solution, preferably, the hook assembly 102 and the corner frame portion 10 are of a thermoplastic integrally-formed structure.

It should be noted that the structure makes the entire assembling process of the frame body 1 more convenient and fast.

On the basis of the above technical solution, it should be noted that there are a variety of structures for the frame as provided by the present disclosure, which includes at least one of the following structures:

Structure 1: continue referring to FIG. 2, the frame body 1 is an integrally formed annular structure formed by the corner frame portions 10.

It should be noted that this structure is simple and easy to simplify the positioning and mounting operations of the frame body 1.

Structure 2: the frame body 1 includes four corner frame portions 10, and the frame body 1 is a split structure formed by four corner frame portions 10.

Specifically, when there is a deviation between the size of the display panel 4 and the size of the frame body 1, the relative positions for the respective corner frame portions 10 of the split-type frame body 1 can be adjusted so that the accommodation space enclosed by the side flanges 103 formed by the outer edges of the base plate 101 can meet the requirement of disposing the display panel 4.

It should be noted that the frame body 1 having a split structure increases the adjustable range of size difference between the frame body 1 and the display panel 4, further reducing the difficulty of the assembling process and the requirement on dimensional precision of the frame body 1.

Figure 3A:
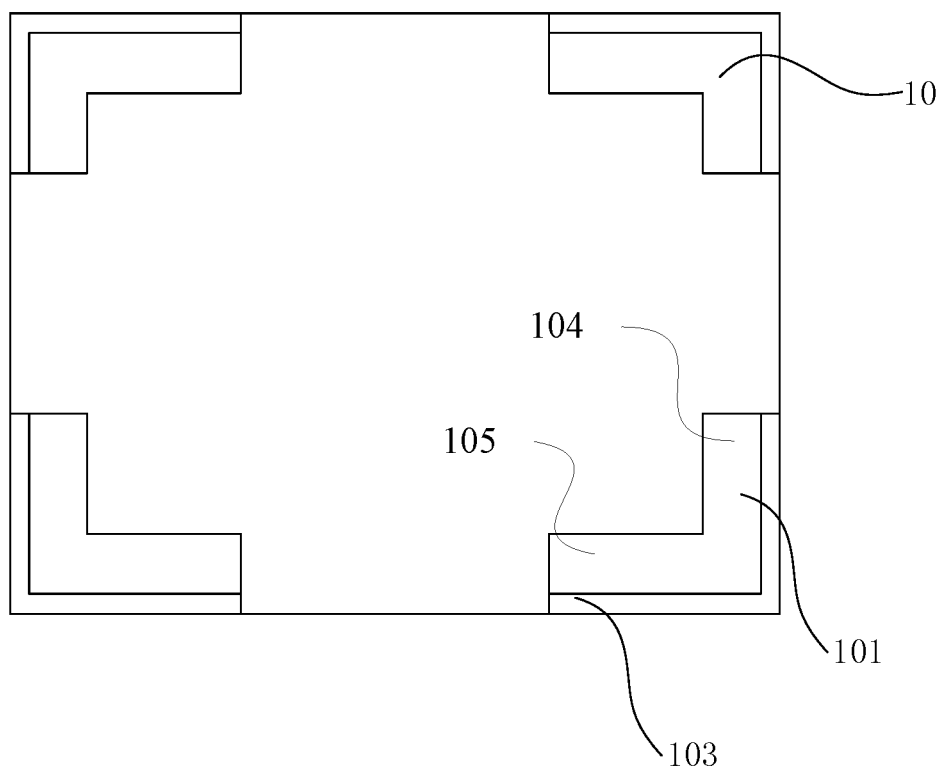
FIG. 3A is a schematic structural diagram of another frame body after being assembled according to an embodiment of the present disclosure.

It should be noted that there are many possibilities for the split structure of the frame body 1, which may be at least one of the following structures:

Implementation structure 1: with reference to FIG. 3A, each of the corner frame portions 10 includes a first side portion 104 and a second side portion 105, and an extending direction of the first side portion 104 is perpendicular to an extending direction of the second side portion 105. The hook assembly 102 includes a first hook (not shown) placed on the first side portion 104 and a second hook (not shown) placed on the second side portion 105.

Figure 3B:
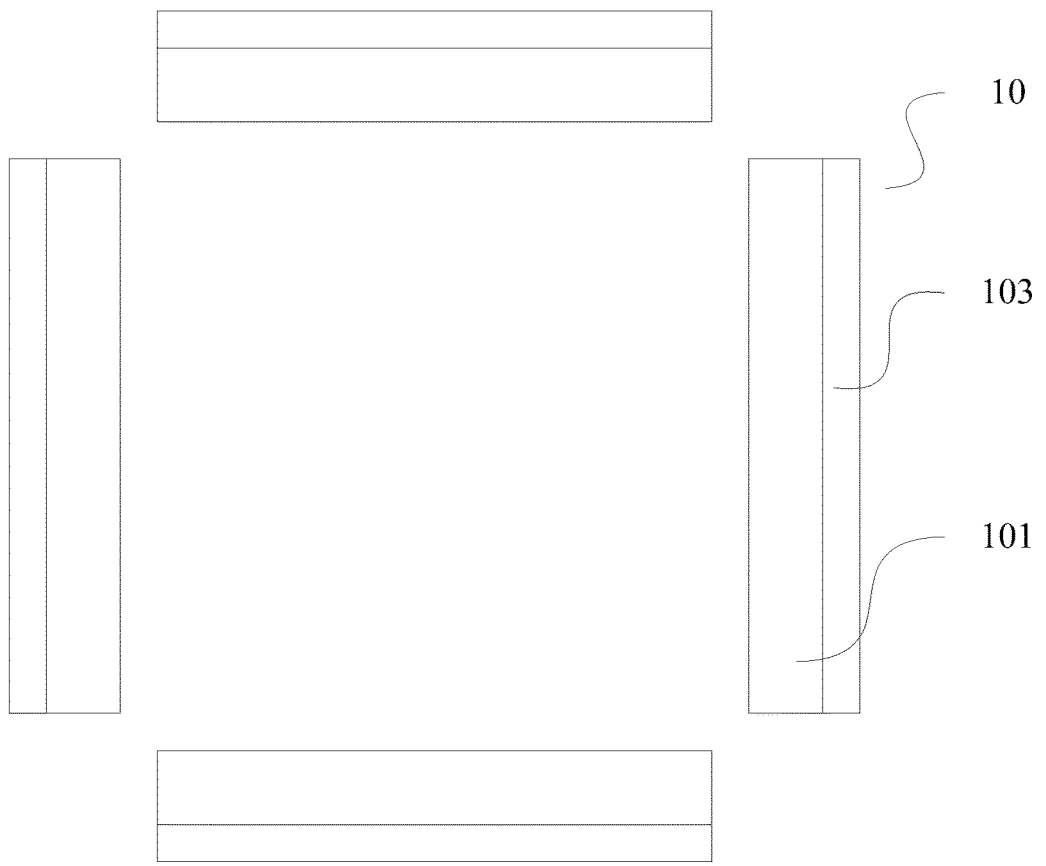
FIG. 3B is a schematic structural diagram of a further frame body after being assembled according to an embodiment of the present disclosure.

Implementation structure 2: with reference to FIG. 3B, each corner frame portion 10 includes a strip-shaped side portion. The hook assembly 102 includes two hooks (not shown), which are arranged along a direction along which the strip-shaped side portion extends.

It should be noted that the structures in the two technical solutions as mentioned above can realize the advantages of the frame body 1 in Structure 2.

Figure 4:
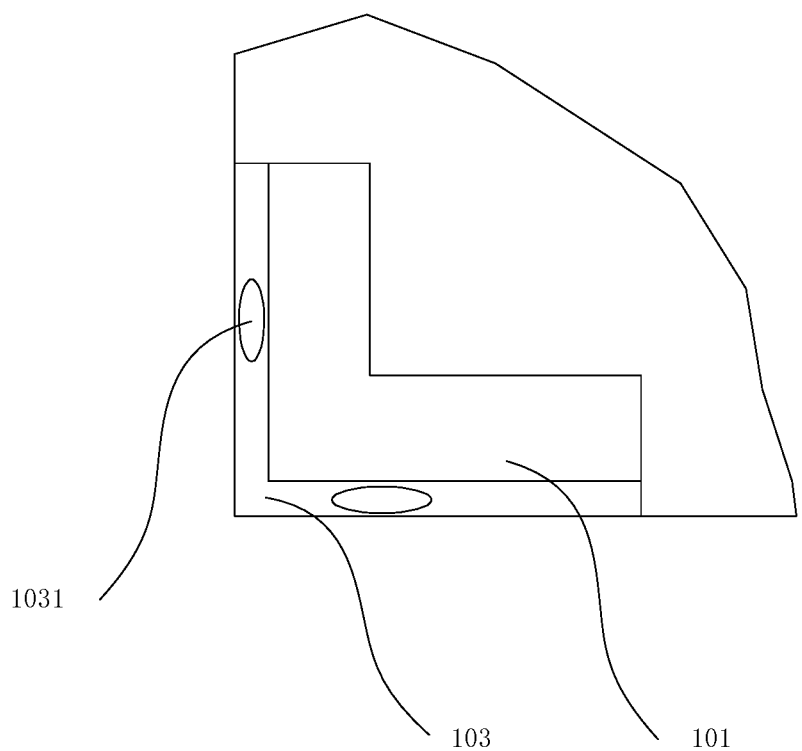
FIG. 4 is a schematic structural diagram after adding a groove to the structure in FIG. 3A.

Based on the above technical solutions of Implementation Structure 1 and Implementation Structure 2, preferably, the side flange 103 of each corner frame portion 10 has a groove 1031 with an opening on a surface of the side flange 103 facing away from the back plate 2, refer to FIG. 4, e.g.

It should be noted that, when the frame body 1 is assembled with a front bezel, a part of air in the groove 1031 is pushed out. Thus air pressure within the groove 1031 will be lower than the outside atmospheric pressure, and the groove 1031 acts like a sucker to have the front bezel better fixed.

Figure 5:
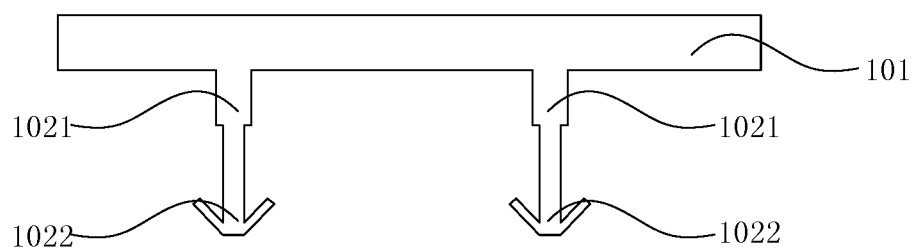
FIG. 5 is a schematic structural diagram when the hook assembly in FIG. 1 is a barb assembly.

Based on the above technical solutions, with reference to FIG. 1 and FIG. 5, the hook assembly 102 is a barb assembly, and the hook in the hook assembly 102 has a barb structure. Each barb includes a fixing column 1021. One end of the fixing column 1021 is provided on the carrying surface, and another end is provided with a barb portion 1022. The frame body 1 is fixed to the back plate 2 by the barb assembly.

In some examples of the present disclosure, the barb in the barb assembly has a barb portion 1022 in a cap structure, and the diameter of the periphery of the cap body is larger than the diameter of the fixing column 1021. The frame body 1 is fixed to the back plate by means of the barb portion 1022 in the barb assembly.

In another examples of the present disclosure, the hook assembly 102 may also have an annular clamping hook, the annular clamping hook includes a fixing column connected with the frame body 1 and an annular clamping hook body on one side of the fixing column, and the back plate 2 can be provided with a fixed protrusion. The annular clamping hook body can engage with the fixed protrusion.

Based on the above technical solution, the frame body 1 can be made of e.g. silica gel according to some embodiments of the present disclosure. Optionally, a Shore Hardness for the material of a frame body 1 may be ranges from, for example, 10 A to 70 A.

Preferably, a material with a Shore Hardness of 35A or 60A may selected to manufacture the frame body 1. The hardness can ensure that when the display panel 4 be placed in the accommodation space enclosed by the side flanges 103 with a relatively large difference between the frame body 1 and the display panel 4, the display panel 4 does not come into rigid contact and thus avoids damage to the corners of the display panel 4.

The present disclosure also provides an optical film 3 which comprises an optical film 3 body. The optical film 3 body is provided with holes corresponding to the hooks in the hook assembly 102 in any kind of frame provided in the above technical solutions. The holes extend along a length direction which is the same as a direction of an adjacent side of the optical film 3 body.

Figure 6:
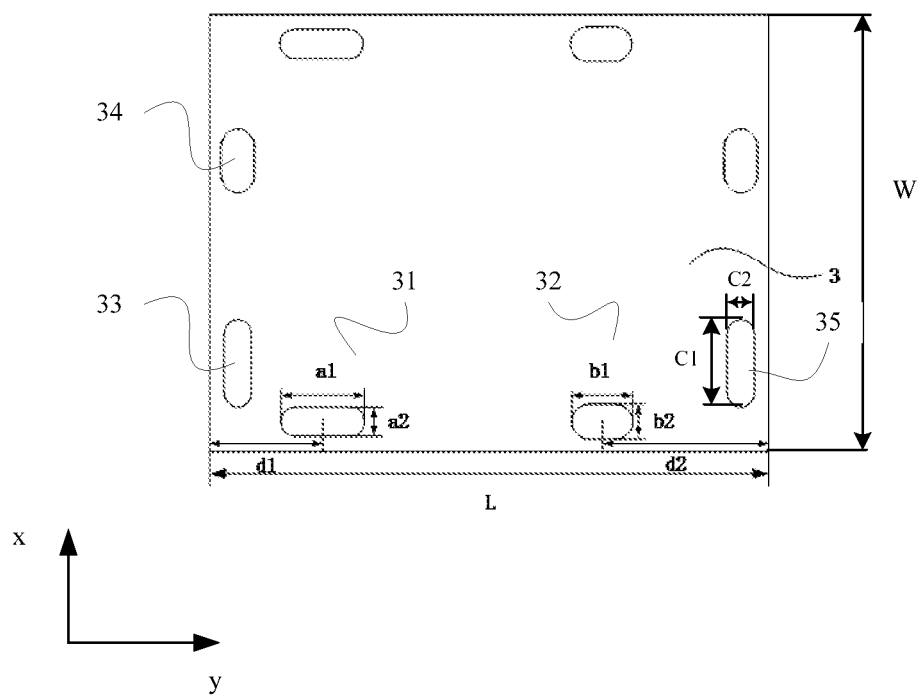
FIG. 6 is a plan view of an optical film according to an embodiment of the present disclosure.

Based on the above technical solution, in an embodiment according to the present disclosure, with reference to FIG. 6, when the hook assembly 102 is a barb assembly, the holes in the optical film 3 body are in one-to-one correspondence with the barbs in the barb assembly in the frame. And the optical film 3 body is provided with two kinds of holes, i.e., a first hole 31 and a second hole 32, in an area corresponding to each corner frame portion. A length of the first hole 31 is greater than a length of the second hole 32, and a width of the first hole 31 is smaller than a width of the second hole 32.

Specifically, with reference to FIG. 6, the length of the first hole 31 is a1, the width is a2, and the length of the second hole 32 is b1, the width is b2. a1 is greater than b1, and a2 is smaller than b2.

It should be noted that the two kinds of holes with difference sizes on the optical film 3 not only achieve an effect of fixing the position but also increase a buffer space when the optical film 3 has thermal deformation, such that the deformation of the optical film 3 along the length and width directions can be buffered.

On the basis of the above technical solution, preferably, with reference to FIG. 6, a ratio of a distance of the first hole 31 on the optical film 3 body from a side of the optical film 3 body to a length of the side of the optical film 3 body where the first hole 31 is located, is smaller than a ratio of a distance of the second hole 32 from an opposite side of the optical film 3 body to the length of the side of the optical film 3 body where the second hole 32 is located. In other words, in case the optical film 3 is in the shape of a rectangle, a ratio of the shortest distance of a center of the first hole 31 to sides of the optical film 3 body along a length direction of the first hole 31 to a length of the side of optical film 3 body along the length direction of the first hole 31, is smaller than a ratio of the shortest distance of a center of the second hole 32 to sides of the optical film 3 body along a length direction of the second hole 32 to a length of the side of optical film 3 body along the length direction of the second hole 32. Here, the length and width of a hole refer to a size of the hole on a surface of the optical film. For example, the length of a hole may be defined as a size of the hole along a first direction, and the width of the hole may be defined as a size of the hole along a second direction that is perpendicular to the first direction. A length of a hole may be larger than a width of a hole. The first direction may be called the length direction of the hole, and the second direction may be called the width direction of the hole. It should be appreciated that for difference holes, the first directions thereof may be different. For example, for the first hole 31 as shown in FIG. 6, its length direction may be defined as x direction, and its width direction may be defined as y direction. For hole 33, for example, its length direction may be defined as y direction, and its width direction may be defined as x direction.

Specifically, with reference to FIG. 6, the length of one side of the rectangle optical film 3 is L, the distance from the center of first hole 31 to one side is d1, and the distance from the center of second hole 32 to the other side opposite to the aforementioned side is d2. A ratio of d1 to L is smaller than a ratio of d2 to L. The second hole 32 is relatively close in position to the first hole 31 so that the optical film 3 between the first hole 31 and the second hole 32, during thermal deformation, no longer extends in a direction towards the second hole 32 due to the restriction imposed by the hook assembly 102 within the second hole 32, but extends in a direction towards the first hole 31 instead. Since the length of first hole 31 is larger, there is plenty of space for the optical film 3 to extend without causing wrinkles due to the excessive deformation between the first hole 31 and the second hole 32 after the optical film 3 is thermally expanded.

Similarly, for the second hole 32 and first hole 35, they may also comply with above requirements. The length direction of first hole 35 is along y direction, and the length direction of the second hole 32 is along x direction. The length of the first hole 35 is C1, width C2. A size of a side of the optical film along y direction is W. Thus, according to the above requirements, a ration of C1 to W is smaller to that of b1 to L.

It should be noted that the structure can fix the optical film 3 more simply, and can also prevent wrinkles from appearing in the optical film because of deformation.

Further, in case the optical film 3 is not a rectangle (e.g. a trapezoid), a ratio of the distance from a center of the first hole 31 on the optical film 3 to a side of the optical film 3 which is closer to the center of the first hole 31 among sides of the optical film 3 along a length direction of the first hole 31 to a length of a side of optical film 3 which is closer to the center of first hole 31 among the sides of the optical film 3 that are parallel to the length direction of the first hole 31, is smaller than a ratio of the distance from a center of the second hole 32 to a side of the optical film 3 which is closer to the center of the second hole 32 among the sides of the optical film 3 along a length direction of the second hole 32 to a length of the side of optical film 3 which is closer to the center of second hole 32 among sides of optical film 32 parallel to a length direction of the second hole 32.

The present disclosure also provides a backlight, comprising a back plate 2, an optical film 3 according to any of the above technical solutions which is disposed on a side of the back plate 2 opposite to a light source, a frame according to any of the above technical solutions which is disposed on a side of the optical film 3 opposite to the back plate 2, wherein the back plate 2 has holes in one-to-one correspondence with the hooks in the hook assembly 102 of the frame body 1; and the back plate 2 is engaged with the frame body 1 by the hooks.

It should be noted that the hook structure enhances the fixation among the back plate 2, the optical film 3 and the frame body 1, so that the positional stability of the frame body 1 can be better improved.

With reference to FIG. 1, the present disclosure further provides a display device comprising a display panel 4 and any kind of the backlight provided in the above technical solutions. The display panel 4 is placed on a side of the frame body 1 opposite to the optical film 3.

Through the above analysis of the technical solutions, it can be seen that the structure of any one of the frames provided in the above technical solutions enables the display device to more easily realize a configuration of narrow bezel.

Based on the above technical solutions, the friction coefficient between the frame body 1 and the display panel 4 is greater than the friction coefficient between the frame body 1 and the optical film 3.

In order to make it difficult for the frame body 1 and the display panel 4 to move relative to each other, as a preferred embodiment, the friction coefficient between the frame body 1 and the display panel 4 is greater than 0.5. In order to make the optical film 3 have a certain possibility of moving, as a preferred embodiment, the friction coefficient between the frame body 1 and the optical film 3 is smaller than 0.5.

Apparently, a person skilled in the art can make various modifications and variations to the embodiments of the present disclosure without departing from the spirit and scope of the present disclosure. In this way, if these modifications and variations of the present disclosure fall within the scope of the claims of the present disclosure and its equivalent technologies, the present disclosure is also intended to include these modifications and variations.

The invention claimed is:

1. A frame for a display device, comprising
a frame body made of a flexible material, wherein the frame body comprises corner frame portions corresponding to corners of the display device, each of the corner frame portions includes a base plate, the base plate has a carrying surface for carrying a display panel; and
a hook assembly provided on a side of the base plate opposite to the carrying surface, wherein the hook assembly is configured to coordinate with a back plate in the display device to fix the frame body to the back plate, wherein an outer edge of the base plate forms a side flange, and side flanges of the corner frame portions coordinate with the carrying surface to form an accommodation space for accommodating the display panel of the display device, the side flange of each of the corner frame portions has a groove with an opening on a surface of the side flange opposite to the back plate, and the groove is a blind hole by which air from a first side of the frame body are stopped from passing through to the side of the base plate opposite to the carrying surface, and wherein:

each of the corner frame portions comprises a first side portion and a second side portion, an extending direction of the first side portion is perpendicular to an extending direction of the second side portion, and the hook assembly includes a first hook provided on the first side portion and a second hook provided on the second side portion; or, each of the corner frame portions includes a strip-shaped side portion, and the hook assembly includes two hooks which are arranged along an extending direction of the strip-shaped side portion.

2. The frame according to claim 1, wherein the hook assembly and the corner frame portions are of a thermoplastic integrally-formed structure.

3. The frame according to claim 2, wherein the frame body is an integrally formed annular structure formed by the corner frame portions.

4. The frame according to claim 2, wherein the frame body comprises four corner frame portions, and the frame body is a split structure formed by the four corner frame portions.

5. The frame according to claim 1, wherein the hook assembly is a barb assembly, and hooks in the hook assembly have a barb structure, each of the hooks includes a fixing column, one end of the fixing column is provided on the carrying surface, another end of the fixing column is provided with a barb portion, and the frame body is fixed to the back plate by the barb assembly.

6. The frame according to claim 1, wherein the frame body is made of silica gel.

7. The frame according to claim 1, wherein a material of the frame body has a Shore Hardness ranging from 10 A to 70 A.

8. An optical film for a display device, comprising an optical film body provided with holes corresponding to hooks in the hook assembly of the frame according to claim 1.

9. The optical film according to claim 8, wherein the holes extend along a length direction which is the same as a direction of an adjacent side of the optical film.

10. The optical film according to claim 9, wherein the hook assembly is a barb assembly, the holes on the optical film body correspond to barbs in the barb assembly within the frame, the holes are provided in regions of the optical film body which correspond to the corner frame portions, the holes include a first hole and a second hole, a length of the first hole is larger than a length of the second hole, and a width of the first hole is smaller than a width of the second hole.

11. The optical film according to claim 10, wherein a ratio of a shortest one of distances from a center of the first hole to edges of the optical film body along a length direction of the first hole to a length of the edge of the optical film body along the length direction of the first hole, is smaller than a ratio of a shortest one of distances from a center of the second hole to the edges of the optical film body along a length direction of the second hole to a length of the edge of the optical film body along the length direction of the second hole.

12. A backlight for a display device, comprising:
a back plate;
an optical film comprising an optical film body provided with holes corresponding to hooks in the hook assembly of the frame according to claim 1, the optical film disposed on a side of the back plate, and
the frame, which is disposed on a side of the optical film opposite to the back plate,
wherein the back plate has holes corresponding to hooks in the hook assembly of the frame body, and the back plate is engaged with the frame body by the hooks.

13. A display device comprising a display panel and a back light according to claim 12, wherein the display panel is provided on a side of the frame body opposite to the optical film.

14. The display device according to claim 13, wherein a friction coefficient between the frame body and the display panel is greater than a friction coefficient between the frame body and the optical film.

* * * * *